United States Patent
Sun et al.

(10) Patent No.: US 9,945,334 B2
(45) Date of Patent: Apr. 17, 2018

(54) POSITIVE CRANKCASE VENTILATION (PCV) DEVICE AND ENGINE ASSEMBLY EMPLOYING THE SAME

(71) Applicant: FORD GLOBAL TECHNOLOGIES, LLC, Dearborn, MI (US)

(72) Inventors: Baocheng Sun, Belleville, MI (US); Li Li, Nanjing (CN); Dallis Sun, Troy, MI (US); Bin Yin, Suzhou (CN); Xihu Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/156,930

(22) Filed: May 17, 2016

(65) Prior Publication Data

US 2017/0002776 A1 Jan. 5, 2017

(30) Foreign Application Priority Data

Jun. 30, 2015 (CN) .......................... 2015 1 0379637

(51) Int. Cl.
*F02M 35/10* (2006.01)
*F01M 13/02* (2006.01)
(Continued)

(52) U.S. Cl.
CPC .... *F02M 35/10222* (2013.01); *F01M 13/023* (2013.01); *F02M 25/06* (2013.01); *F02M 35/104* (2013.01); *Y02T 10/121* (2013.01)

(58) Field of Classification Search
CPC ........... F02M 35/10222; F02M 35/112; F02M 35/104; F02M 35/10; F01M 13/00; F01M 13/022
See application file for complete search history.

(56) References Cited

U.S. PATENT DOCUMENTS 5,307,784 A * 5/1994 Choma .................. F02M 26/50
123/568.17
6,192,848 B1 * 2/2001 Hada ................ F02M 35/10131
123/184.24
(Continued)

FOREIGN PATENT DOCUMENTS

JP 5136306 B2 2/2013
KR 100345836 B1 * 7/2002
KR 20130057189 A 5/2013

OTHER PUBLICATIONS

"Dual PCV VS Single PCV Questions & Routing", http://www.thirdgen.org/forums/tbi/452219-dual-pcv-vs-single.html, Dec. 2007, 24 pages.
(Continued)

*Primary Examiner* — Long T Tran
(74) *Attorney, Agent, or Firm* — Brooks Kushman P.C.; Greg Brown

(57) ABSTRACT

An engine assembly is provided with an intake manifold having a manifold body downstream of a fresh air intake port. The manifold body has a wall defining first and second apertures spaced apart from one another. A positive crankcase ventilation (PCV) device is provided with a PCV pipe having a first end in fluid communication with a crankcase and a second end connected to first and second PCV branches. The first and second PCV branches are in fluid communication with the first and second apertures. A method is provided and directs a first portion of gases from the crankcase to the first aperture via the PCV pipe and the first PCV branch, and directs a second portion of gases from the crankcase to the second aperture via the PCV pipe and the second PCV branch.

20 Claims, 4 Drawing Sheets

(51) Int. Cl.
*F02M 35/104* (2006.01)
*F02M 25/06* (2016.01)

(56) References Cited

U.S. PATENT DOCUMENTS

| | | | |
|---|---|---|---|
| 6,807,957 B2* | 10/2004 | Ko | F02M 25/06 123/184.21 |
| 7,198,040 B2 | 4/2007 | Noda et al. | |
| 7,305,958 B2* | 12/2007 | Doko | F02M 35/10039 123/184.21 |
| 8,919,329 B2 | 12/2014 | Lohr et al. | |
| 9,556,767 B2* | 1/2017 | Newman | F01M 13/028 |
| 2004/0159299 A1* | 8/2004 | Uchiyama | F02M 25/06 123/184.42 |
| 2006/0161505 A1* | 7/2006 | Sattler | G07B 17/00467 705/406 |
| 2006/0191505 A1* | 8/2006 | Doko | F02M 35/10039 123/184.59 |
| 2013/0118433 A1* | 5/2013 | Tochizawa | F02M 35/10026 123/184.21 |
| 2014/0326226 A1* | 11/2014 | Senda | F01M 13/0011 123/573 |
| 2015/0159596 A1* | 6/2015 | Wakiya | F01M 13/00 123/41.86 |

OTHER PUBLICATIONS

"Dual PCV Setup", http://www.oldspower.com/vb/showthread.php?t=57252, Apr. 2011, 12 pages.

* cited by examiner

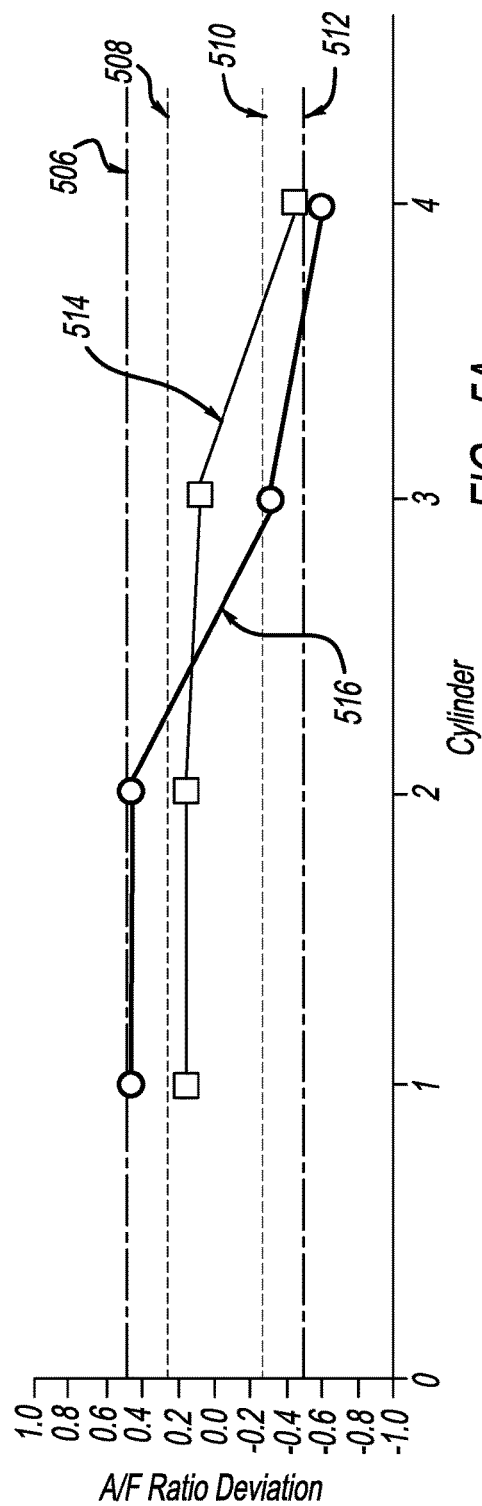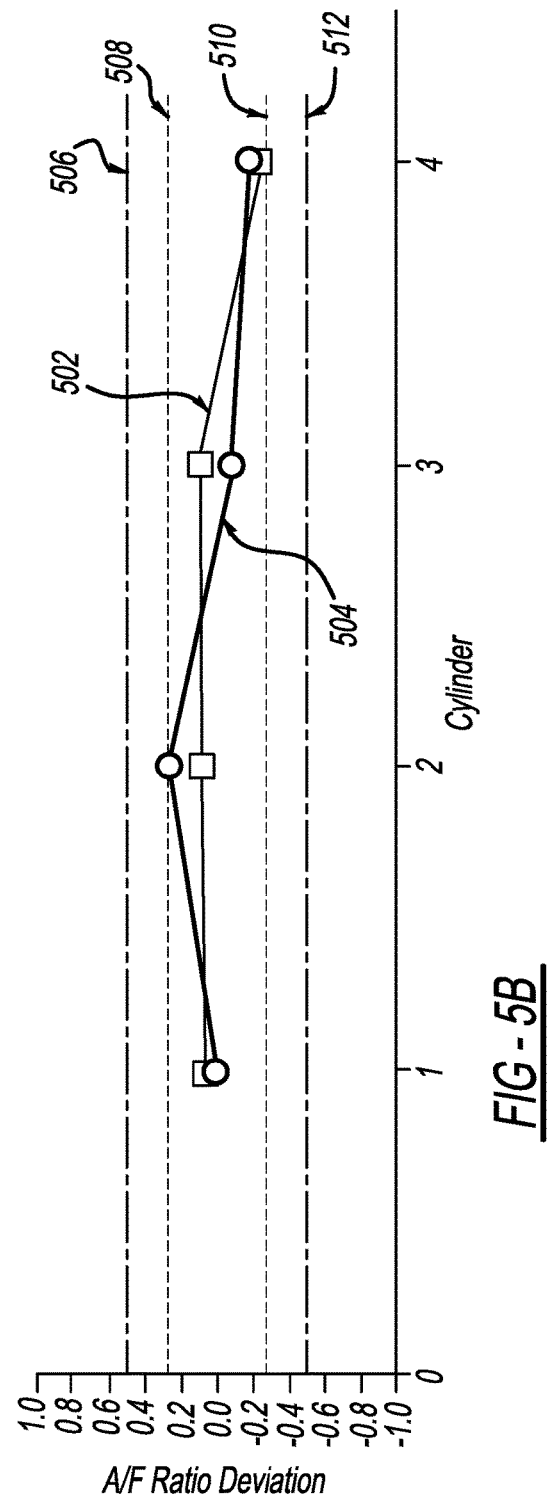
FIG-5A
FIG-5B

POSITIVE CRANKCASE VENTILATION (PCV) DEVICE AND ENGINE ASSEMBLY EMPLOYING THE SAME

CROSS-REFERENCE TO RELATED APPLICATIONS

This application claims foreign priority benefits under 35 U.S.C. § 119(a)-(d) to CN 2015 10 37 96 37.0 filed Jun. 30, 2015, which is hereby incorporated by reference in its entirety.

TECHNICAL FIELD

The present invention relates in general to a positive crankcase ventilation (PCV) device and an engine assembly employing the same.

BACKGROUND

During engine operations, certain portions of the fuel-containing gases may, without having been fully combusted, enter into the crankcase through open spaces between the engine piston and the engine cylinder, and accordingly such portions of the gases may be termed blow-by gases. According to certain existing technologies, positive crankcase ventilation (PCV) devices may be used to collect the blow-by gases from the crankcase to facilitate more complete combustion and to reduce waste emissions.

SUMMARY

In one or more embodiments, an engine assembly includes an intake manifold including a manifold body downstream of a fresh air intake port, the manifold body having a wall defining first and second apertures spaced apart from one another and in fluid communication respectively with first and second positive crankcase ventilation (PCV) branches.

The engine assembly may further include a crankcase and a PCV pipe, the PCV pipe in fluid communication with and connecting the crankcase to the first and second PCV branches. The first and second PCV branches may be integrally formed with the PCV pipe.

The first aperture may be positioned closer to the intake port than the second through-aperture such that they are longitudinally spaced from one another. The first through-aperture may be greater in cross-sectional open area than the second through-aperture.

The engine assembly may further include first, second, third and fourth runners extending sequentially from the manifold body, wherein the first aperture is positioned between the first and second runners and the second aperture is positioned between the third and fourth runners.

The engine may be of a 3-cylinder configuration and the engine assembly may further include first, second, and third runners extending sequentially from the manifold body, wherein the first aperture is positioned between the first and second runners and the second aperture is positioned between the second and third runners.

The first and second apertures may be open toward or facing the crankcase. Alternatively, the first and second apertures may be facing away from the crankcase.

In another or more embodiments, a positive crankcase ventilation (PCV) device for an engine includes a PCV pipe with a first end in fluid communication with a crankcase and a second end, and first and second PCV branches extending from the second end of the PCV pipe and in fluid communication with first and second spaced apart apertures defined by an intake manifold.

The first PCV branch of the PCV device may differ from the second PCV branch in cross-sectional open area.

The first and second PCV branches of the PCV device may be integrally formed with the PCV pipe.

In another embodiment, a method of operating an engine, includes directing a first portion of gases from a crankcase to a first aperture of an intake manifold via a positive crankcase ventilation (PCV) pipe and a first PCV branch, and directing a second portion of gases from the crankcase to a second aperture of the intake manifold via the PCV pipe and a second PCV branch. The first and second apertures are fluidly connected to a plenum of the intake manifold.

The method may further include adjusting fluid flow within at least one of the PCV pipe and first and second PCV branches via cross-sectional area differences between the PCV branches and/or apertures.

BRIEF DESCRIPTION OF THE DRAWINGS

FIG. 5A illustrates a graph depicting air/fuel ratio deviation by cylinder of an engine assembly according to an embodiment; and FIG. 5B illustrates another graph depicting air/fuel ratio deviation by cylinder of an engine assembly according to an embodiment.

DETAILED DESCRIPTION

Figure 1:
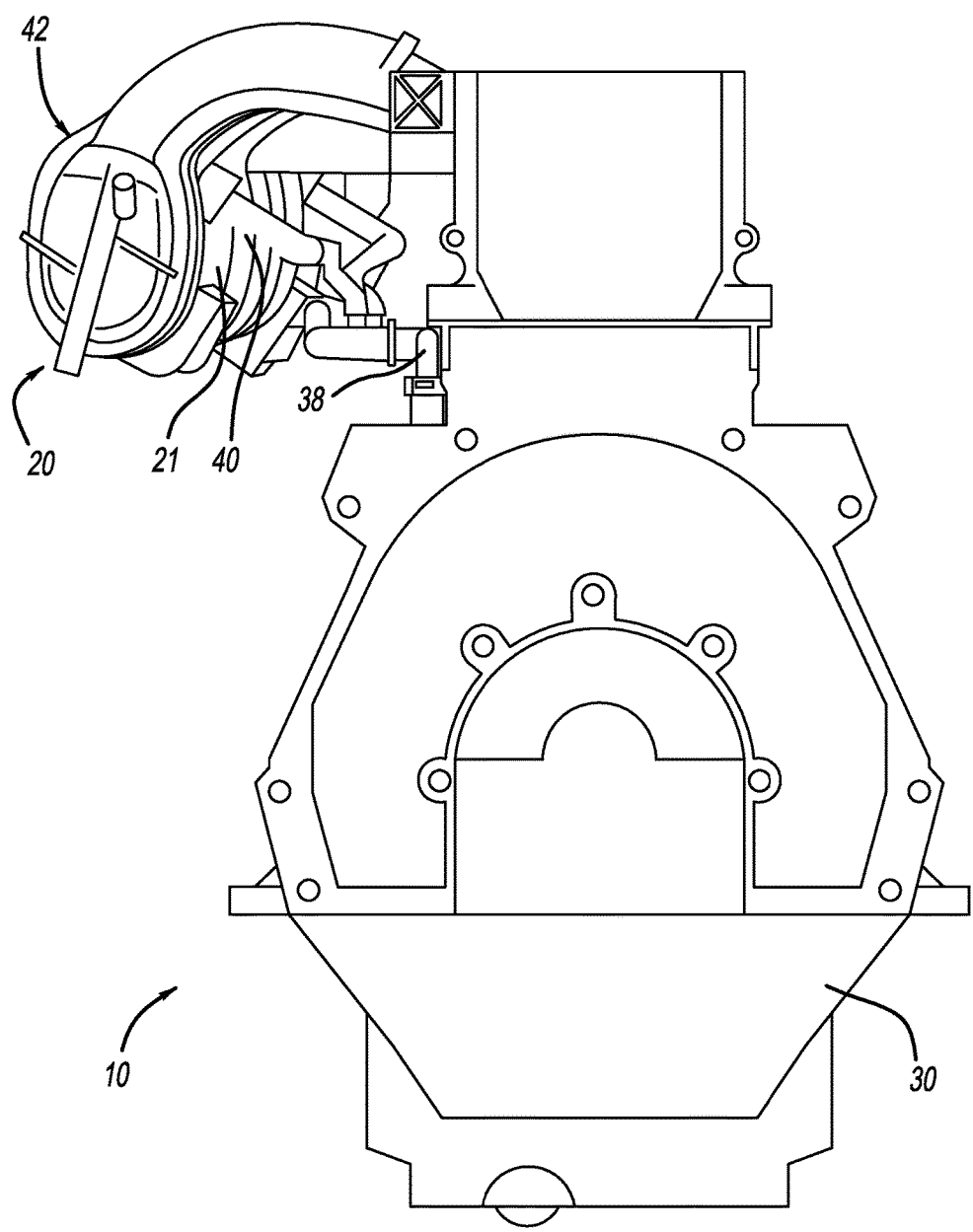
FIG. 1 illustrates a perspective view of an engine assembly according to one or more embodiments of the present disclosure.

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As referenced in the Figures, the same reference numerals may be used herein to refer to the same parameters and components. These parameters and components are included as examples and are not meant to be limiting. The drawings referenced herein are schematic and associated views thereof are not necessarily drawn to scale.

Various embodiments according to the present disclosure have associated non-limiting advantages. For example, a PCV device is provided for recycling blow-by gases. The PCV device may be connected to an intake port and its vicinity such that collected blow-by gases may be more effectively mixed with fresh air or outside air from the intake port. Temperatures within the intake port may be relatively low due to the negative pressure within the intake port and the relatively low temperature of the fresh air. Ice may form around the intake port from the moisture present in the blow-by gases meeting up with the low temperatures at the intake port. When outside temperature is sufficiently low, retained moisture may freeze or form ice, and in certain instances a large formation of ice may block or partially block the intake port and the blockage may result in the engine not operating as usual, or an engine shutdown event. As described herein, the PCV device disclosed herein may overcome one or more issues associated with water or ice accumulation at or around the intake manifold.

Figure 2:
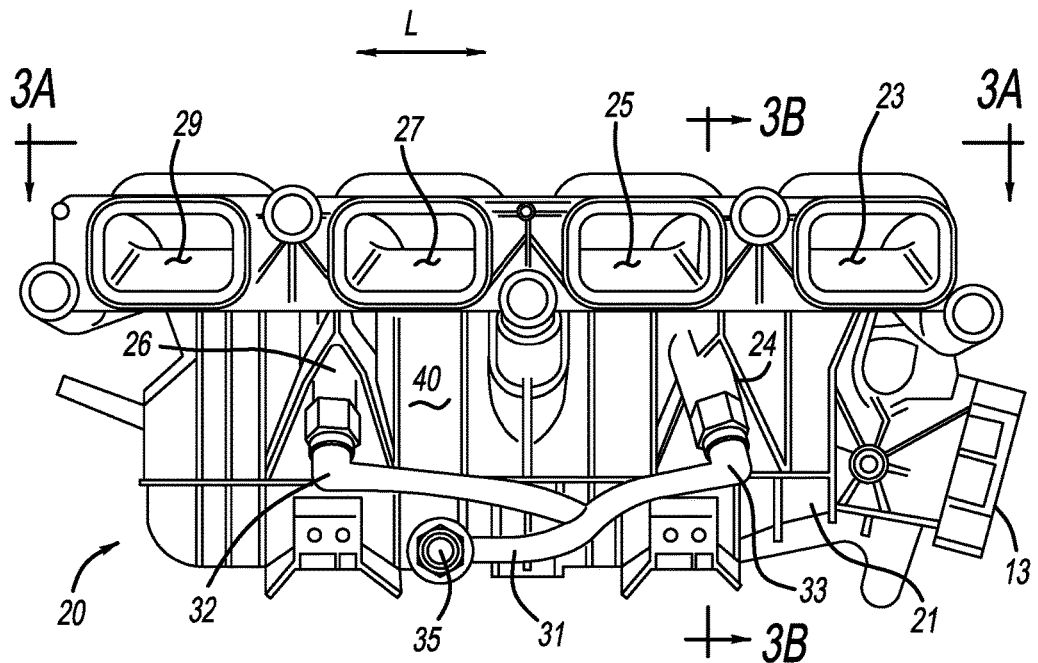
FIG. 2 illustrates a front view of an intake manifold of the engine assembly referenced in FIG. 1.
Figure 3A:
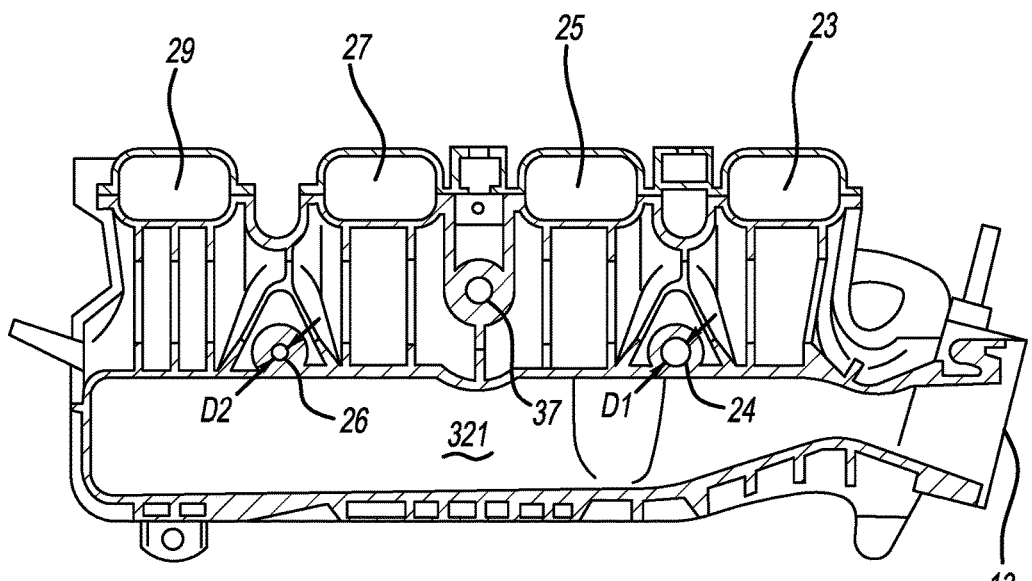
FIG. 3A illustrates a first cross-sectional view of the intake manifold referenced in FIG. 2, taken along line 3A-3A.
Figure 3B:
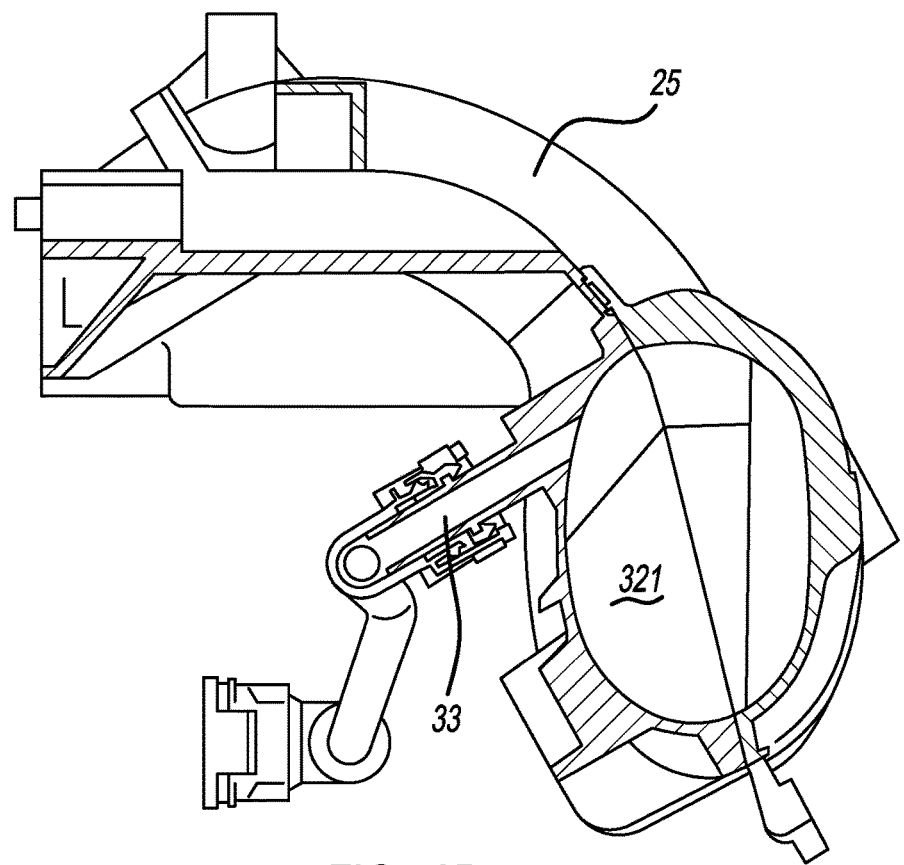
FIG. 3B illustrates a second cross-sectional view of the intake manifold referenced in FIG. 2, taken along line 3B-3B.

In one or more embodiments, and in view of FIG. 1 and further in view of FIG. 2, FIG. 3A and FIG. 3B, which respectively depict a frontal view of the intake manifold referenced in FIG. 1, a transverse cross-sectional view taken along line 3A-3A, and a longitudinal cross-sectional view taken along line 3B-3B, an engine assembly 10 includes an intake manifold 20 positioned downstream of an intake port (not shown) and including a manifold body 21. The manifold body 21 includes first and second spaced apart through-apertures 24, 26 on a wall that are in fluid communication with first and second positive crankcase ventilation (PCV) branches 32, 33. The first and second apertures 24, 26 extend through the wall.

The engine assembly 10 further includes a crankcase 30 and a PCV device 38 positioned upon or fluidly connected to the crankcase 30. The PCV device 38 collects blow-by gases from the crankcase 30, and the PCV device 38 may be positioned within or attached externally to the crankcase 30. The PCV device 38 is connected to the intake manifold 20 via the PCV pipe 31, such that blow-by gases may enter the intake manifold 20 and be combined or mix with fresh air coming through the intake port inlet 13 and then be transported to the engine combustion chamber(s) in cylinder for combustion. The PCV pipe 31 is in fluid communication with and connected to the first and second PCV branches 32, 33, such that fluid or blow-by gases from the PCV device 38 enters the PCV pipe 31, and is divided into two portions and in two directions, for example, in two different directions, and then enters the manifold body 21 respectively via the first and second PCV branches 32, 33 to mix with incoming outside air.

The engine assembly 10 may be of any suitable configuration. In various embodiments, the engine may be an inline engine, a V-type engine or any other suitable engine, and may be of 3-cylinder, 4-cylinder, or 6-cylinder or other number of cylinders in design. In certain non-limiting examples, and in view of FIGS. 1-3, the engine assembly 10 is an inline 4-cylinder engine, where the intake manifold 20 includes the manifold body 21 and runners 23, 25, 27, 29 extending out from the manifold body 21. The intake manifold 20 includes an intake port inlet 13 for connection to the intake port. The manifold body 21, and in particular an external wall 40 of the manifold body 21, defines two spaced apart through apertures 24, 26, with aperture 24 closer to the intake port inlet 13 than aperture 26 along a longitudinal direction L.

The aperture 24 may be positioned between runners 23, 25 along direction L. Similarly the aperture 26 may be positioned between runners 27 and 29, or between runners 25 and 27 along direction L. The apertures 24 and 26 are in fluid communication respectively with the branches 32, 33 of the PCV pipe 31. In this configuration, and when the first and second apertures 24, 26 are respectively positioned between runners 23, 25, and runners 27, 29, a third PCV branch pipe (not shown) may be additionally employed to be in fluid communication with the manifold body 21 via a third aperture 37, which may be positioned on the wall 40 between the runners 25, 27 along direction L.

The other end 35 of the PCV pipe 31 is in fluid communication with the PCV device 38 such that the engine blow-by gases flow from the PCV device 38 and directly enter the manifold body 21 of the intake manifold 20 without having to be near the intake port inlet 13. Because the engine blow-by gases enter the manifold body 21 apart or away from the intake port inlet 13, freezing of any moisture contained within the engine blow-by gases and any resultant ice formation is less likely to occur.

With the fluid connection of the PCV device 38 to the intake manifold 20 as shown herein, the blow-by gases from the PCV device 38 may be favorably directed to an area or location that is further away from the intake port inlet 13, and accordingly issues associated with water and/or ice accumulation at or around the intake port inlet 13 may be reduced or mitigated while the blow-by gases may be effectively cycled through the engine combustion chambers.

The use of two or more apertures such as first and second apertures 24, 26 through which blow-by gases may enter the manifold body 21 at different locations and optionally in variable flow may provide additional benefits. The design of two or more apertures such as the apertures 24, 26 helps facilitate mixing of the blow-by gases with fresh air within the manifold body 21 after their entry through the intake manifold 20. The blow-by gases may flow separately through the spaced apart apertures 24, 26 into the intake manifold at different locations, such that the blow-by gases may be mixed with the fresh air from the intake port inlet 13 as early and as concurrently as possible, thereby avoiding excessive variations in the air/fuel ratio within the intake manifold, and improving uniformity of the air/fuel ratios across various runners.

The first and second branch pipes 32, 33 may merge into the PCV pipe 31 at a location outside of or external to the manifold body 21. The merge location may be of any suitable position relative to the wall 40 of the manifold body 21. Alternatively, the PCV pipe 31 may be a natural and integral extension of the first branch pipe 32 or the second branch pipe 33. Alternatively, the PCV pipe 31 and the first and second branch pipes 33, 34 are integral in material and construction, and therefore are of a single, integral piece, where the integral piece may be formed via molding, for example, by injection molding a single or blended material.

In addition, and in view of FIG. 2 and FIG. 3B, aperture 24 may be positioned between runners 23, 25 and aperture 26 may be positioned between runners 27, 29, such that the engine blow-by gases do not directly enter the runners. The apertures 24, 26 may be positioned to be in direct fluid communication with a plenum or cavity 321 in the manifold body 21, mix with fresh air coming through the intake manifold inlet 13 and then enter each of the runners 23, 25, 27, 29 after mixing. This configuration may reduce interrupting or disturbing the fluid flow otherwise caused by the engine blow-by gases.

The PCV pipe 31 is connected at its end 35 to the PCV device 38, and includes at the other end at least two branches 32, 33 in communication with the apertures 24, 26, respectively. To obtain a differentiated distribution of the engine blow-by gases, and in view of FIG. 3A, the PCV branch 32 which is closer to the intake port inlet 13 may be greater in cross-sectional area than the PCV branch 33 which is farther away from the intake port inlet 13. The PCV pipe 31 may be in material continuation with and hence be integral to the branches 32, 33, and alternatively, the PCV pipe may be formed via connection of various separate branches and components.

In one example, fresh air enters the manifold body 21 of the intake manifold 20 through the intake port inlet 13, and takes time for the fresh air to move and be distributed within the manifold body 21 from the inlet 13, through the cavity 231 and to the runners. Accordingly aperture 24 which is closer to the intake port inlet 13 may have a cross-section D1 that is greater than a cross-section D2 of aperture 26 which is farther away from the intake port inlet 13. The fresh air enters the manifold body 21 from the intake port inlet 13 and then travels in cavity 321 to the other end of the manifold 21 that is farther away from the intake port inlet 13, such that the non-uniform distribution of the blow-by gases through the apertures 24, 26 favorably matches up with the non-uniform distribution of the fresh air thus entered and present from the runner 23 to the runner 29, and accordingly mixing of the blow-by gases with the fresh air inside of the manifold body 21 and inside cavity 321 may be more uniformly distributed.

In certain examples, and as shown in FIGS. 1-3, apertures 24, 26 may be positioned and defined on the wall 40 of the manifold body 21, where the wall 40 faces towards the PCV device 38. In other words, apertures 24, 26 may be open or facing toward the engine crankcase 30.

Figure 4:
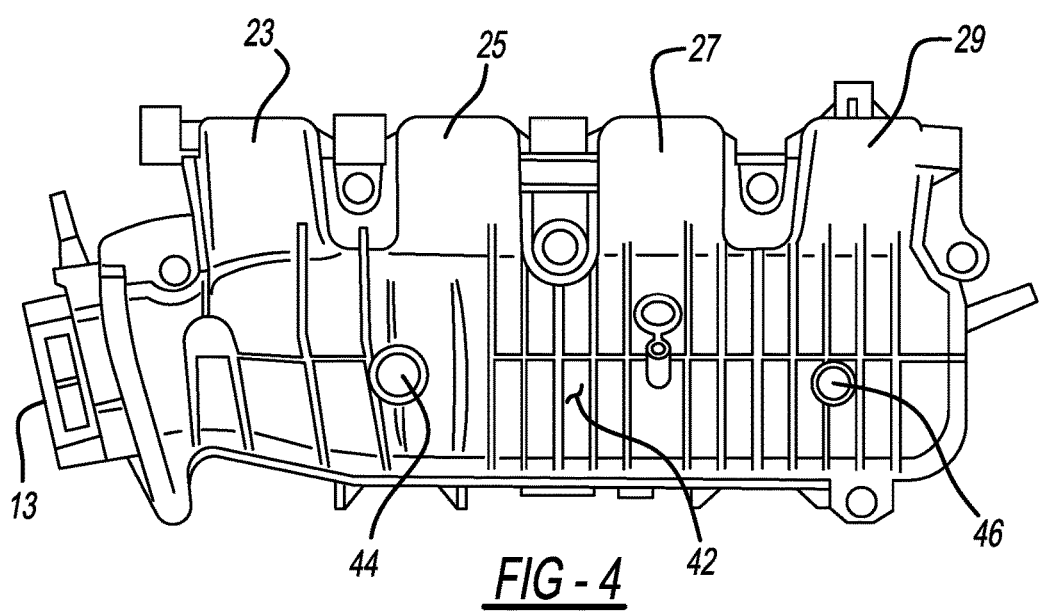
FIG. 4 illustrates a rear view of the intake manifold of the engine assembly referenced in FIG. 1 according to another embodiment.

In another example, as shown in FIG. 4, apertures 44, 46 may be defined on a back wall 42 of the manifold 21 that is facing away from the PCV device 38 and opposed to wall 40. The apertures 44, 46 may be configured similarly to the apertures 24, 26, respectively, for connection with pipes 33, 32 and collectively to the PCV pipe 31. The configuration as depicted in FIG. 4 may be beneficial in situations where available space is limited between the intake manifold body 21 and the PCV device 38. Alternatively, in a further example, both sets of apertures 24, 26 and 44, 46 may be provided on the manifold 20 along with their corresponding PCV pipes to provide additional use or possible flow paths for the blow-by gases.

The air/fuel ratio of each of the engine cylinders may be determined via hydromechanics or fluid dynamics analysis, and may also be determined via engine test runs. In an example described below, the air/fuel ratios are determined via computerized mechanical simulation under various engine operating conditions and are provided for two different engine configurations. FIG. 5A is based on a control engine assembly similar to the engine assembly 10 depicted in FIGS. 1-3, with only the second aperture 26 being provided by the intake manifold 20 and without the presence of the first aperture 24 such that blow-by gases are only routed into the intake manifold 20 via aperture 26. Resulting variations in air/fuel ratio are reported and shown in FIG. 5A.

FIG. 5A shows maximum permissible range of variations of measurable air/fuel ratios relative to desirable air/fuel ratios in cylinders 1 to 4 under various engine operating conditions. In this example, a value of air/fuel ratio, such as 14.6 percent (%), is set as a standard such that variations in air/fuel ratio within the intake manifold are not to exceed a certain range from the standard, such as the standard plus and minus 0.5%, represented by the region on the graph defined between the lines 506 and 512 of FIG. 5A provides stable engine combustion and avoids engine turbulence. Similarly, variations in air/fuel ratio within the intake manifold are not to exceed a certain range from the standard when the engine is at idle, such as the standard plus and minus 0.25%, represented by the narrower region on the graph defined between the lines 508 and 510. Line 514 represents actual air/fuel ratio variations in each of the cylinders with the engine operating at a high speed. Line 516 represents air/fuel ratio variations in each of the cylinders when the engine is operating at idle. As shown in FIG. 5A, and when only a single aperture 26 is provided on the intake manifold 20 wall, the engine blow-by gases may not mix well with fresh air within the intake manifold 20 to provide a uniform air/fuel ratio within range of the standard, as indicated in values on lines 514 and 516 which are near to or exceed the permissible range, and accordingly substantial engine turbulence or shaking may be detectable and engine combustion or functionality may also be compromised.

FIG. 5B illustrates variations in air/fuel ratio under various engine operating conditions using engine assembly 10 with both apertures 24, 26 as shown in FIGS. 1-3 provided by the intake manifold 20 and receiving blow-by gases from the crankcase. In FIG. 5B, the wall of the intake manifold 20 defines two apertures 24, 26. The air/fuel ratio standard and ranges for acceptable variations therefrom correspond with those described above with respect to FIG. 5A. Line 502 represents the air/fuel ratio variations for each cylinder under high speed engine operating conditions. Line 504 represents variations in air/fuel ratio for each cylinder when the engine is operating at idle. As shown in FIG. 5B, and regardless of whether the engine is under high speed operating conditions or at idle, variations in air/fuel ratio of each of the cylinders are within permissible ranges. The PCV pipe 31, 32, 33 is connected with two or more through apertures 24, 26, which allows engine blow-by gases to concurrently enter different areas of the cavity 321 and within the manifold body 21, such that mixing of the blow-by gases with fresh air within the cavity 321 of the manifold body 21 may be expedited, more uniform air/fuel ratios may result for the mixed gases in each of the runners, and accordingly variations in air/fuel ratio of each of the cylinders may be reduced.

The engine 10 with two apertures 24, 26 for connection with the PCV pipe 31, 32, 33 provides reduced variations in air/fuel ration than the engine with only one aperture.

In one or more embodiments, the present disclosure provides for a more even distribution of engine blow-by gases to various runners of the intake manifold, by providing a simple and easy-to-manufacture structure in which engine blow-by gases may be distributed more uniformly within the intake manifold and away from the inlet 13 so as to reduce ice formation from the moisture present within the blow-by gases.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine assembly, comprising:
 an intake manifold including a manifold body downstream of a fresh air intake port, a plenum of the manifold body having a wall defining first and second apertures in fluid communication respectively with first and second positive crankcase ventilation (PCV) branches, the first and second apertures spaced apart from one another and offset from runners extending from the manifold body.

2. The engine assembly of claim 1, further comprising a crankcase and a PCV pipe, the PCV pipe in fluid communication with and connecting the crankcase to the first and second PCV branches.

3. The engine assembly of claim 2, further comprising a PCV valve;
wherein the PCV pipe has a first end and a second opposed end, the first end connected to the PCV valve, the second end connected to the first and second PCV branches; and
wherein the crankcase is in fluid communication with the plenum of the intake manifold via the PCV valve, PCV pipe, and first and second PCV branches.

4. The engine assembly of claim 3 wherein the first PCV branch directs a first portion of blow-by gases from the crankcase to the first aperture; and
wherein the second PCV branch directs a second portion of blow-by gases from the crankcase to the second aperture.

5. The engine assembly of claim 2, wherein the first and second PCV branches are integrally formed with the PCV pipe.

6. The engine assembly of claim 2, wherein the first and second apertures are positioned to face the crankcase.

7. The engine assembly of claim 2, wherein the first and second apertures are positioned to face away from the crankcase.

8. The engine assembly of claim 1, wherein the intake port and the first and second apertures are longitudinally spaced apart such that the first aperture is positioned between the intake port and the second aperture.

9. The engine assembly of claim 8, wherein the first aperture has a larger cross-sectional area than the second aperture to provide a non-uniform distribution of blow-by gases through the first and second apertures.

10. The engine assembly of claim 1, wherein the runners include first, second, third and fourth runners sequentially extending from the manifold body, wherein the first aperture is positioned between the first and second runners and the second aperture is positioned between the third and fourth runners.

11. The engine assembly of claim 1, wherein the runners include first, second, and third runners sequentially extending from the manifold body, wherein the first aperture is positioned between the first and second runners and the second aperture is positioned between the second and third runners.

12. A positive crankcase ventilation (PCV) device for an engine, comprising:
a PCV pipe having a first end for fluid communication with a crankcase and a second end; and
first and second PCV branches connected to and extending from the second end of the PCV pipe for fluid communication with first and second apertures defined by a plenum wall of an intake manifold, the first PCV branch having a larger cross-sectional area than the second PCV branch to provide a non-uniform distribution of blow-by gases through the first and second PCV branches.

13. The PCV device of claim 12, wherein the first and second PCV branches are integrally formed with the PCV pipe.

14. The PCV device of claim 12 further comprising a PCV valve connected to the first end of the PCV pipe.

15. A method of operating an engine, comprising:
directing a first portion of gases from a crankcase to a first aperture in a plenum wall of an intake manifold via a positive crankcase ventilation (PCV) pipe and a first PCV branch; and
directing a second portion of gases from the crankcase to a second aperture in the plenum wall via the PCV pipe and a second PCV branch.

16. The method of claim 15, wherein the first and second apertures and an air intake port defined by the intake manifold are longitudinally spaced from one another, the first aperture positioned between the second aperture and the air intake port.

17. The method of claim 15 wherein the first portion of gases is larger than the second portion of gases based on a larger cross-sectional area of the first PCV branch compared to the second PCV branch such that a non-uniform distribution of flow is provided through the first and second apertures and into the plenum.

18. The method of claim 15 wherein the first portion of gases is larger than the second portion of gases based on a larger cross-sectional area of the first aperture compared to the second aperture such that a non-uniform distribution of flow is provided through the first and second apertures and into the plenum.

19. The method of claim 15, further comprising:
mixing the first portion of gases with fresh air in the plenum adjacent to the first aperture, the first aperture positioned between first and second runners of the manifold; and
mixing the second portion of gases with fresh air in the plenum adjacent to the second aperture, the second aperture positioned between third and fourth runners of the manifold.

20. The method of claim 18 wherein the first and second portions of gases are mixed with fresh air in the plenum upstream of a series of runners of the manifold; and
wherein the non-uniform distribution of flow of the gases through the first and second apertures corresponds with a non-uniform distribution of fresh air in the plenum.

* * * * *